United States Patent [19]

Johnson et al.

[11] Patent Number: 4,771,975

[45] Date of Patent: Sep. 20, 1988

[54] VEHICLE SEAT POSITION ADJUSTER

[75] Inventors: Richard F. Johnson, Bloomfield Hills; Elaine Schultz, Troy, both of Mich.

[73] Assignee: Semec, Inc., Troy, Mich.

[21] Appl. No.: 906,733

[22] Filed: Sep. 11, 1986

[51] Int. Cl.$^4$ ............................................. A45D 19/04
[52] U.S. Cl. .................................... 248/393; 248/430
[58] Field of Search ............... 248/393, 430, 429, 420; 297/341, 318; 296/65 R

[56] References Cited

U.S. PATENT DOCUMENTS 2,809,690 10/1957 Walther et al. .
4,168,050 9/1979 Nerem et al. .
4,395,011 7/1983 Torta .
4,539,540 7/1985 Hayden et al. .

Primary Examiner—J. Franklin Foss
Assistant Examiner—Sarah A. Lechok Eley
Attorney, Agent, or Firm—Cullen, Sloman, Cantor, Grauer, Scott & Rutherford

[57] ABSTRACT

A vehicle seat is constrained for adjustable movement in two degrees of freedom, viz., tilting and longitudinal sliding by an apparatus which includes three longitudinally-extending, laterally-parallel tracks in the outer two of which are retained a pair of followers attached to the bottom edge of the seat for guiding the seat longitudinally and for tilting it vertically thereabout. A carrier slides along the center track and is lockable in a plurality of longitudinal positions. A tilt-adjustment-arm is pivotally attached to the carrier at one end and has a second end pivotally attached to the seat generally rearward of the front edge and is lockable in a plurality of tilt positions relative to the carrier to permit the seat to be locked in one of a plurality of independent tilt positions.

17 Claims, 6 Drawing Sheets

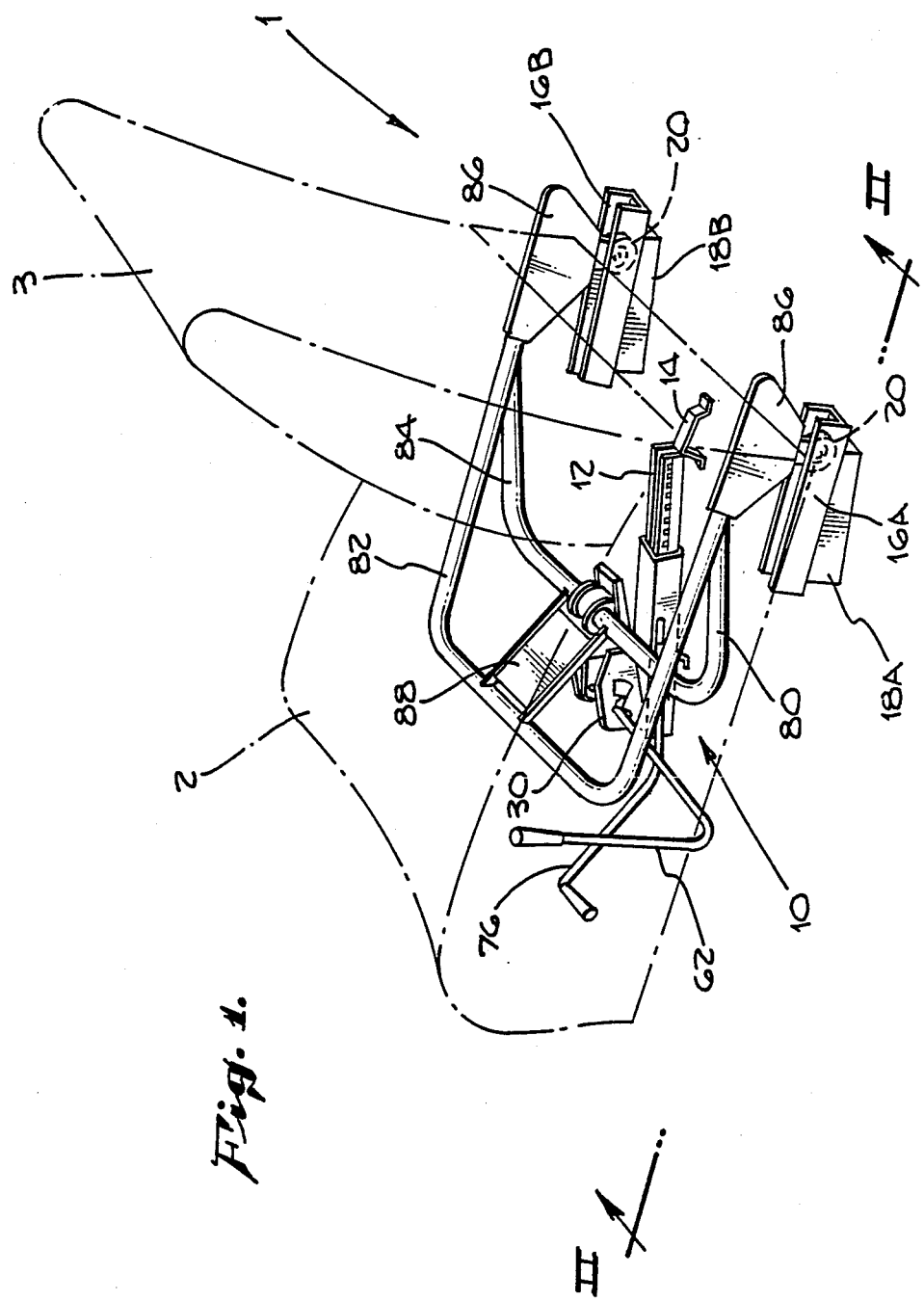

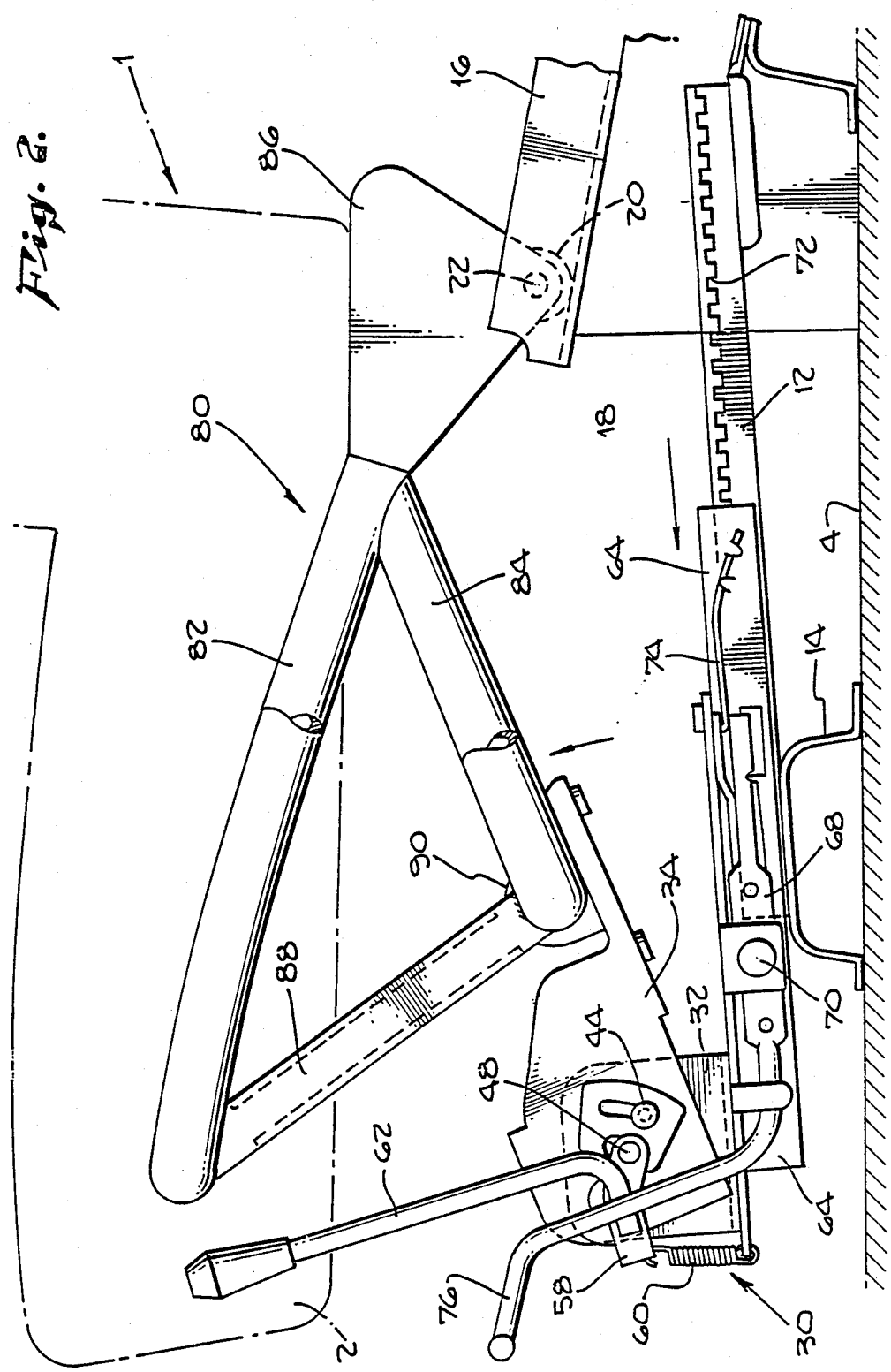

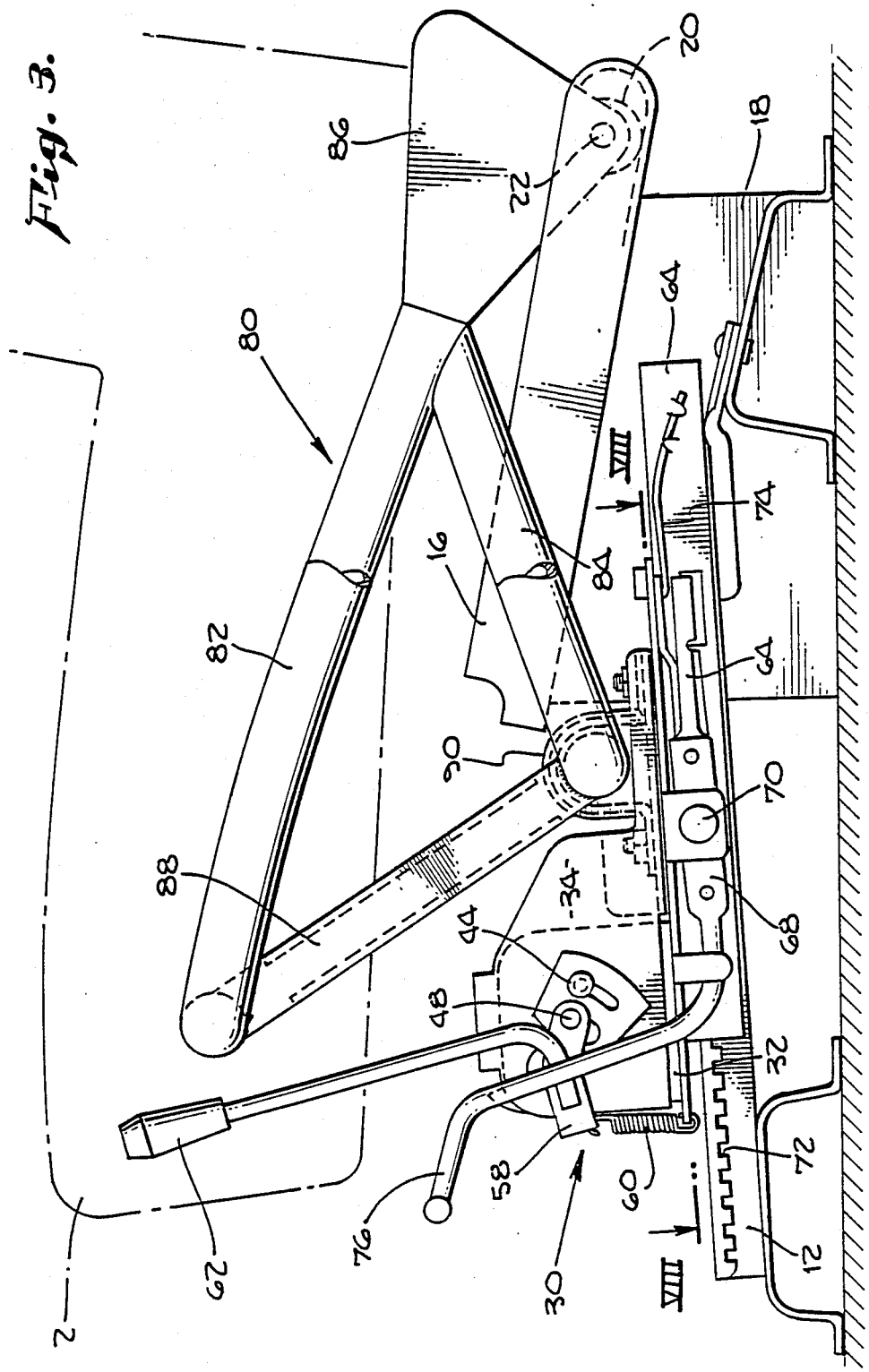

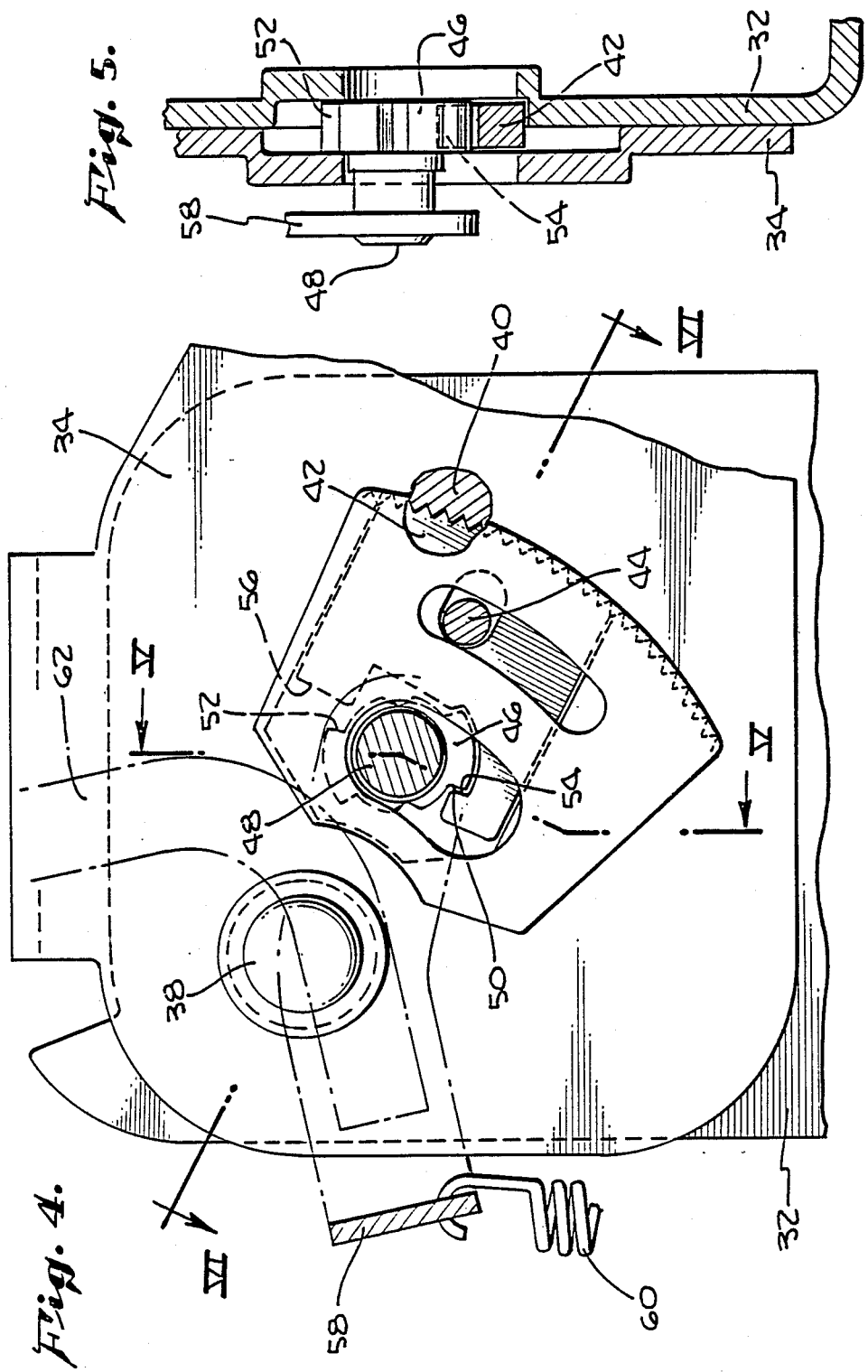

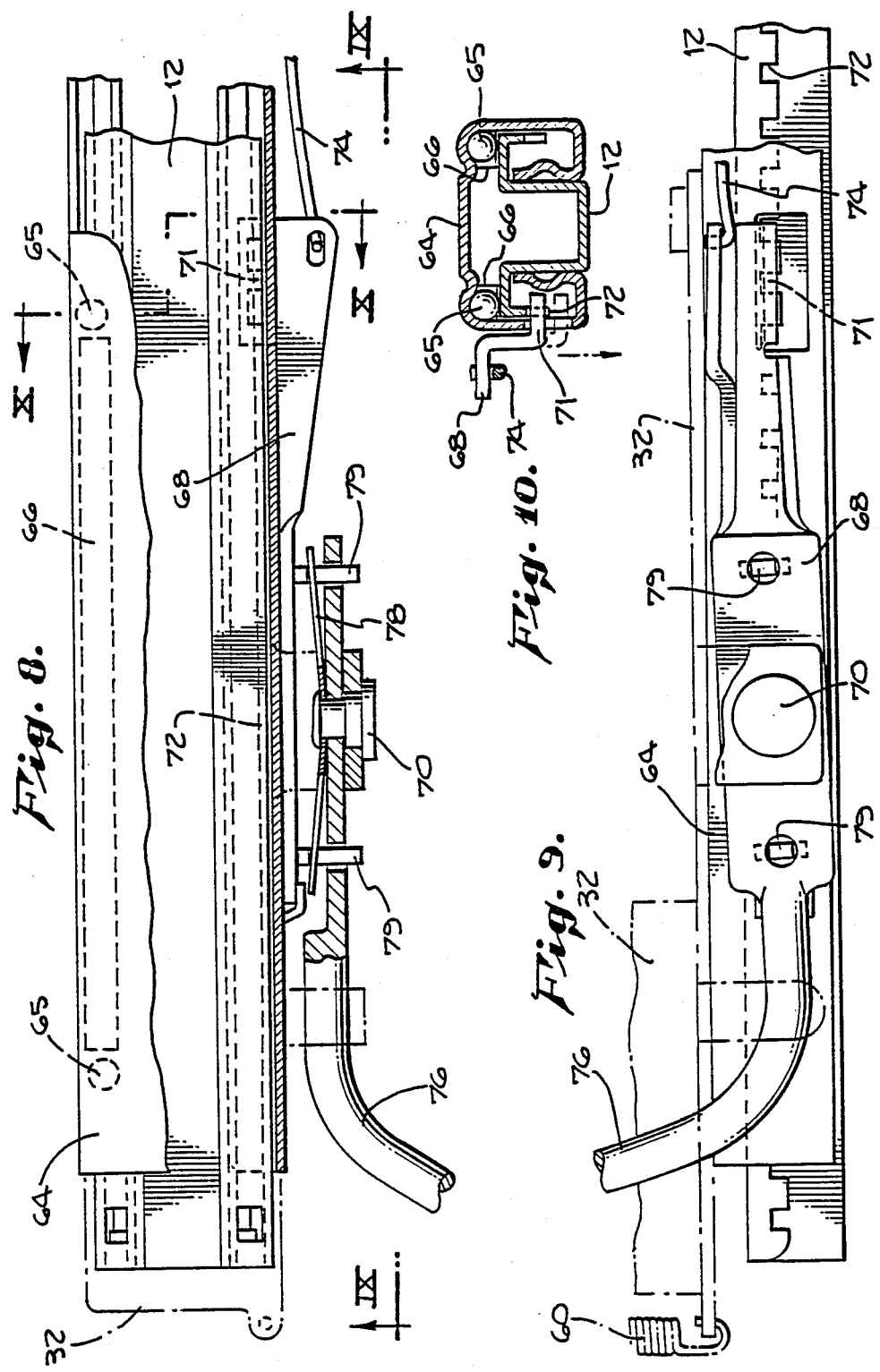

VEHICLE SEAT POSITION ADJUSTER

BACKGROUND OF THE INVENTION

1. Field of the Invention

This invention pertains, in general, to vehicular and automotive hardware, and in particular, to an apparatus for adjusting the tilt and longitudinal positions of a vehicle's seat.

2. Description of the Related Art

Almost universally, automobiles and other vehicles are equipped with a seat, at least in the front, whose position is adjustable for driver comfort and to permit operating controls to be reached safely with the hands and feet.

Recent-vintage automobiles are frequently equippped with seat positioners permitting adjustment in a number of degrees of freedom, e.g., fore-and-aft, up-and-down, tilting, and may also include means for permitting inclining and reclining of the backrest relative to the bottom part of the seat. Fore-and-aft, or longitudinal, positioning is typically accomplished in automobiles by means of a pair of longitudinally-extending, laterally-parallel tracks attached to the vehicle upon which a pair of carriers slides, at least one of which is lockable to one of the tracks to permit the seat to be adjusted through a plurality of longitudinal positions. The tilt position of the seat, if adjustable, may typically be adjusted by means of a number of mechanisms, among which include a pair of adjustable hinges, each of which attaches to one of the aforementioned carriers.

One of the problems with the two-track positioner is that it does not accommodate the short-than-average driver or taller-than-average driver well in terms of leg-length adjustment and sitting height adjustment within the vehicle, i.e., as the seat moves forward or backward to accommodate these drivers, the seat should automatically compensate in terms of tilt position and height to adjust for these drivers. Another problem with these prior art devices is that, if they do provide for independent tilt-position adjustment, use of this adjustment feature may result in an undesirable simultaneous longitudinal movement of the seat.

It is therefore an object of the present invention to provide an apparatus for adjusting the longitudinal and tilt position of a vehicular seat in which the tilt-position and height of the seat is automatically adjusted during longitudinal movement of the seat to accommodate taller-than-average and shorter-than-average drivers, which also permits an independent tilt-position adjustment which does not result in simultaneous longitudinal movement of the seat. It is a further object of the present invention to provide such an apparatus which is combined in a simple mechanism which is inexpensive to manufacture and assemble in production quantities, yet which achieves a simple, safe and reliable operation during use.

SUMMARY OF THE INVENTION

These objects are preferably accomplished by the provision, in a vehicle having an adjustable seat, of three longitudinally-extending, laterally-parallel tracks attached to the vehicle below the seat, one of the tracks being located generally in the middle of the seat and being inclined toward the rear, and the other two being located bilateral thereof and inclined toward the front and in which run a pair of followers attached to the underside of the seat and located generally toward its rear edge. A carrier is constrained to roll along the central track generally toward the front of the seat, and includes means for locking and unlocking the carrier in a plurality of longitudinal positions along the track. An arm having two ends is pivotally attached at one end to a position generally rearward of the front edge of the seat by about the length of the arm, and attached at the other end for pivotal movement to the carrier, and has means for locking and unlocking the arm in a plurality of pivotal positions relative to the carrier.

The invention and its objects and advantages will be more readily understood by those skilled in the art from a consideration of the following detailed description of the preferred embodiments, particularly when read in conjunction with the appended drawings, of which a brief description now follows.

BRIEF DESCRIPTION OF THE DRAWINGS

FIG. 1 is a left-hand rear perspective view of a typical vehicle seat (shown in phantom lines) in which is incorporated the apparatus of the present invention (shown in solid lines), and in which sectional view II—II is taken;

FIG. 2 is a side view into the apparatus, as revealed by the sectional view II—II taken in FIG. 1, illustrating the seat translated fully-forward and tilted fully-upward by the apparatus;

FIG. 3 is similar to FIG. 2, except that the seat is illustrated translated fully-rearward and tilted fully-downward by the apparatus;

FIG. 4 is a more detailed view into the side of a carrier assembly in the apparatus;

FIG. 5 is a detailed sectional view through a cam in the carrier assembly, as revealed by the section V—V taken in FIG. 4;

FIG. 8 is a partial sectional view through the top of the carrier assembly, as revealed by the section VIII—VIII taken in FIG. 3, illustrating portions of a central track and a second pawl-and-rack mechanism for adjusting the longitudinal position of the carrier;

FIG. 9 is a partial sectional view into the side of the longitudinal pawl-and-rack mechanism, as revealed by the section IX—IX taken in FIG. 8; and FIG. 10 is a detailed cross-sectional view into the end of the track and longitudinal pawl-and-rack mechanism, as revealed by the section X—X taken in FIG. 8.

DETAILED DESCRIPTION OF THE PREFERRED EMBODIMENTS

Figure 6:
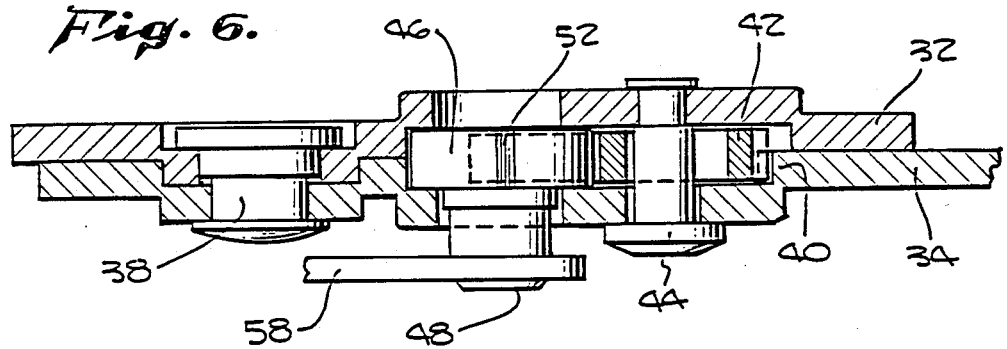
FIG. 6 is a detailed sectional view through a pivot point and the cam of the carrier of the apparatus, as revealed by the section VI—VI taken in FIG. 4.

FIG. 1 illustrates in perspective an exemplary preferred embodiment of an apparatus 10 in keeping with the subject of the present invention, as used in conjunction with a typical vehicle seat 1.

Vehicle seat 1 typically comprises a bottom, or seat part 2 and a backrest part 3.

Apparatus 10 is disposed generally below seat 1 and is contained laterally between its sides. Apparatus 10 includes three longitudinally-extending, laterally-parallel tracks, consisting of a central track 12 attached to the vehicle 5, and a pair of rear tracks 16A and 16B on either side thereof attached to vehicle 4 by mounting brackets 18A and 18B, respectively.

Central track 12 is mounted with a rearward inclination of about 5°-6°, whereas rear tracks 16A and 16B are mounted with an equal inclination to the front of about 10°.

A pair of followers, each of which is constrained within one of rear tracks 16 is attached to seat 1 at generally the lower, rear edge to permit seat 1 to be pivoted thereabout. Preferably, followers 20 comprise a pair of rollers pinioned to seat 1 about point 22 for rolling movement within tracks 16.

Figure 7:
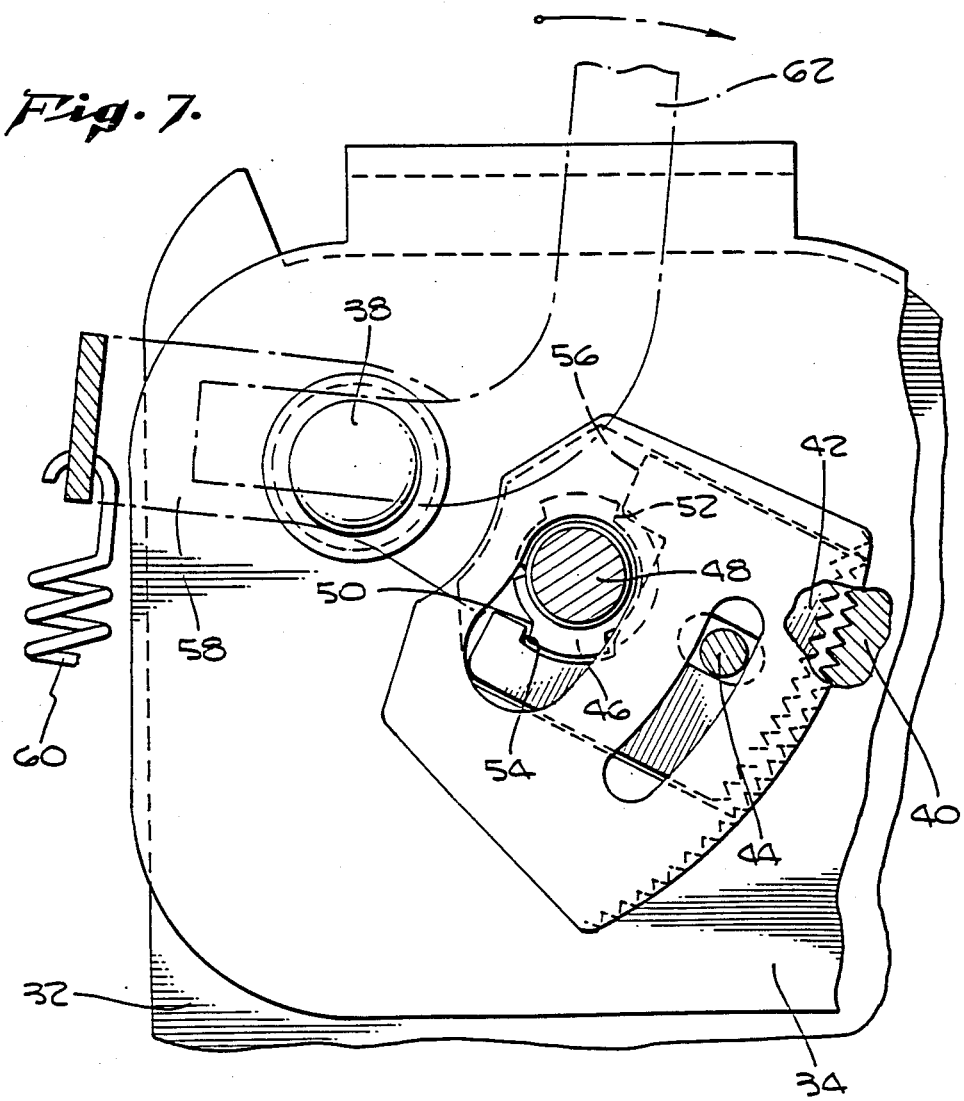
FIG. 7 is a detailed view into the side of the carrier showing actuation of a pawl-and-rack mechanism within the carrier assembly for unlocking the apparatus for pivotal movement.

Slidably-retained upon central track 12 toward the front of seat 1 is carrier assembly 30. In the exemplary preferred embodiment illustrated, carrier 30 comprises a U-shaped, fixed upper part 32 which has a bifurcated arm 34 pivotally-attached thereto by means of a pair of suitable bearings, such as the rivet-bearings 38 illustrated (see FIGS. 4-7). The other end of arm 34 is pivotally-attached to the underside of seat 1 generally rearward of the front edge of seat 1 by about the length of pivoting arm 34 and is used to adjust the position of vertical rotation or tilt, of seat 1 about followers 20 at its rear.

Thus, as skilled practitioners will recognize, as seat 1 is moved longitudinally forward within vehicle 4, carrier assembly 30 and followers 20 are constrained to follow their corresponding, inclined tracks 12 and 16, respectively, such that seat 1 is simultaneously tilted forward and raised at its rear edge to accommodate the shorter-than-average occupant. Conversely, movement of seat 1 toward the rear of vehicle 4 results in the simultaneous tilting back of seat 1 and lowering of its rear edge to accommodate the taller-than-average driver.

Carrier means 30 further comprises means for selectively locking and unlocking arm 34 in one of a plurality of tilt positions relative to carrier assembly 30. In the preferred embodiment illustrated, these means comprise a concave, arcuate rack 40 having a plurality of teeth stamped or die-formed into one of the bifurcations of arm 34.

Slidably-retained on fixed part 32 of carrier assembly 30 is a pawl 42 having a convex, arcuate, toothed portion disposed concentrically with pivot point 38 of arm 34 for radial movement relative to pivot point 38 by means of a fastener, such as rivet 44 extending through a slot contained in pawl 42. A cam 46 is pivotally attached to fixed part 32 by bearing shaft 48 and includes an unlocking face 50 and a locking face 52 for engaging a pair of locking and unlocking tangs 54 and 56 on pawl 42, respectively. An offset 58 is attached to cam 46 and has biasing means, such as a tension spring 60 for biasing offset 58, and hence cam 46 and pawl 42, toward engagement with rack 40. A tilt-adjustment-arm 62 is attached to offset 58 and extends upward to terminate in a handle to permit manual locking and unlocking of pawl 52, and hence arm 34, in a plurality of tilt positions relative to carrier assembly 30.

A comparison of FIGS. 2 and 3 reveals the arm 34 in its maximum and minimum positions of tilt, respectively, with movement from the latter position to the former being in the direction of the arrow shown in FIG. 2. A comparison of FIGS. 4 and 7 reveals the tilt-position-adjustment means in the locked and unlocked positions, respectively, unlocking movement of pawl 42 away from engagement with rack 40 illustrated in FIG. 4 being accomplished by movement of arm 62 in the direction of the arrow shown in FIG. 7. Because of the angles of inclination of central track 12 and rear tracks 16, respectively, and as a result of the geometry of the movement of arm 34 relative to carrier assembly 30 and seat 1, respectively, independent operation of the tilt-adjustment means results in only an insignificant amount of concurrent longitudinal movement of seat 1, a desirable result.

Carrier assembly 30 further comprises a lower part 64 slidably retained on center track 12 for longitudinal movement therealong, and preferably, is bearinged for smooth, rolling action therealong by friction reduction means, such as a plurality of ballbearings 65 retained between track 12 and lower part 64 and spaced apart by bearing spacers 66 (see FIGS. 8-10.)

The lower portion of carrier assembly 30 further includes means for selectively locking and unlocking carrier 30 in one of a plurality of longitudinal positions along central track 12. In the exemplary preferred embodiment illustrated, these means include a straight pawl 68 pivotally-attached to lower part 64 of carrier assembly 30 about a rivet-bearing 70 attached to lower part 64. Straight pawl 68 includes at least one tooth 71 for locking engagement with one of a plurality of teeth contained in a straight rack 72 attached to central track 12. In the embodiment illustrated, straight rack 72 is formed integrally of lower track 12. Biasing means, such as the leaf spring 74 illustrated in the figures, normally biases straight pawl 68 toward a position of locking engagement with straight rack 72. A longitudinal-adjustment-arm 76 is attached to straight pawl 68 by means of a keeper 78 and a pair of pins 79 and extends upwardly to terminate in a handle to permit selective, manual disengagement of straight pawl 68 from rack 72, thereby freeing carrier assembly 30 for longitudinal movement along central track 12.

The apparatus 10 of the present invention preferably includes a structural frame 80 incorporated within the seat 1 to provide structural integrity to seat 1 and to provide better control over dimensional constraints between the elements of apparatus 10 and seat 1.

Support frame 80 comprises a pair of tubular, U-shaped members bifurcated toward the front of seat 1 into an upper member 82 and lower member 84, upper member 82 having a transverse portion extending laterally within the front of seat 1 at about its front edge and a pair of bilateral arms extending rearwardly therein and terminating in a pair of ends at about the lower rear edge of seat 1. Lower member 84 also includes a transverse portion extending laterally below the front of seat 1 at a distance from the front edge about equal to the length of arm 34 and a pair of bilateral arms extending rearwardly under seat 1 and joining the rear ends of upper member 82 in a pair of gusset panels 86 to which followers 20 may be conveniently attached. Joining the middle of the transverse portions of upper member 82 and lower member 84 is a bar extending centrally between them and rigidly attached a either end to rigidize and support frame 80 overall. The juncture of arm 88 and lower member 84 provides a structurally-sound point of attachment for pivotal attachment of pivot arm 34 by means of a bearing assembly 90.

The longitudinal movement of seat 1 is best illustrated in FIGS. 2 and 3, in which seat 1 is depicted in its most-forward and most-rearward positions, respectively, carrier assembly 30 moving from the latter position to the former in the direction of the arrow illustrated in FIG. 2.

A majority of the parts of apparatus 10 may be fabricated inexpensively from alloys of mild steel using simple stamping, coining or bending operations. The elements, when assembled into the exemplary apparatus illustrated, provide a safe, reliable and flexible means for adjusting the longitudinal and tilt positions of the seat within a vehicle. In this regard, it should be noted that the materials, methods of manufacture, and their assembly illustrated and discussed herein are intended to be exemplary in nature, and that suitable modifications or adaptions will readily suggest themselves to skilled practitioners, depending upon the particular application at hand. Accordingly, the spirit and the scope of the instant application should be limited only by the claims appended hereafter.

We claim:

1. A vehicle seat position adjuster, comprising:
   three longitudinally-extending, laterally-parallel tracks attached to a vehicle below a seat, one of said three being located generally central of said seat and the other two generally bilateral thereof;
   follower means attached to said seat and engaged with said bilateral tracks to permit longitudinal translation and rotation of said seat relative thereto;
   position-adjustment means attached to said seat and engaged with said central track for adjusting said seat through a range of both longitudinal and tilt positions relative thereto; and
   means for locking and unlocking said seat-adjustment means in selectable individual longitudinal and tilt positions within said range; and
   said central track is slightly inclined toward the front or rear of said vehicle and said bilateral tracks are slightly inclined in the opposite direction such that, with longitudinal movement of said seat toward the front of said vehicle, said seat is simultaneously raised and tilted forward, and with longitudinal movement toward the rear, said seat is simultaneously lowered and tilted back; and further including:
   means for adjusting said tilt position of said seat independently of said longitudinal movement of said seat such that operation thereof results in substantially no longitudinal movement of said seat.

2. The apparatus of claim 1, wherein said follower means further comprises:
   roller means attached to said seat and engaged with said bilateral tracks for both longitudinal rolling and tilting of said seat relative thereto.

3. The apparatus of claim 1 further comprising:
   carrier means for engaging said central track for translational movement therealong through a range of longitudinal positions;
   means for locking and unlocking said carrier means in selectable individual longitudinal positions within said longitudinal range;
   tilt-position-adjustment means attached to said seat and engaged with said carrier means for adjusting said seat through a range of tilt positions relative to said carrier means; and
   means for locking and unlocking said tilt-position-adjustment means in selectable, individual tilt positions within said tilt range.

4. The apparatus of claim 3, wherein said tilt-position-adjustment means further comprises:
   a seat-tilt arm having one end pivotally-attached to said seat and a second end pivotally-attached to said carrier.

5. The apparatus of claim 4, wherein said means for locking and unlocking said tilt-position adjustment means further comprises:
   a first rack and pawl, one being mounted to said arm and the other to said seat or said carrier means for relative movement into and out of locking engagement with each other; and
   means for biasing said first rack and pawl into and out of said locking engagement at selectable individual tilt positions within said tilt range.

6. The apparatus of claim 5, wherein said means for locking and unlocking said carrier means further comprises:
   a second rack and pawl, one being mounted to said carrier means and the other to said central track for relative movement into and out of locking engagement with each other; and
   means for biasing said second rack and pawl into and out of locking engagement at selectable individual longitudinal positions within said longitudinal range.

7. In a vehicle equipped with an adjustable seat, an apparatus for adjusting the longitudinal and tilt positions of said seat, comprising:
   three longitudinally-extending, laterally-parallel tracks attached to said vehicle below said seat, one of said three being located generally central of said seat and the other two generally bilateral thereof;
   a pair of followers attached bilaterally to the bottom of said seat generally towards its rear, each said follower being engaged with one of said lateral tracks for both longitudinal rotation and translation relative thereto;
   an arm having one end attached centrally to the bottom of said seat generally toward its front for longitudinal rotation thereabout, said arm having a second end engaged with said central track for both longitudinal rotation and translation relative thereto;
   means for selectively locking and unlocking said arm in one of a plurality of tilt positions about said second end, relative to said central track; and
   means for selectively locking and unlocking said arm in one of a plurality of longitudinal positions along said central track; and
   said lateral tracks incline equally toward the front of said vehicle, and said central track inclines toward the rear of said vehicle for automatically compensating the tilt-position and vertical height of said seat simultaneously with longitudinal movement of said seat within said vehicle.

8. The apparatus of claim 7, further comprising:
   a carrier slidably-engaged with said central track for longitudinal translation therealong, said second end of said arm being pinioned to said carrier for longitudinal rotation relative thereto.

9. The apparatus of claim 7, wherein said pair of followers further comprises:
   a pair of rollers pinioned to said seat for longitudinal rotation relative thereto and constrained vertically within said tracks for longitudinal rolling therein.

10. The apparatus of claim 8, wherein said means for selectively locking and unlocking said arm in one of a plurality of tilt positions further comprises:
    an arcuate rack fixed to said arm, said rack having a concave, toothed portion disposed concentrically with said second end of said arm;

an arcuate pawl having a convex, toothed portion disposed concentrically with said second end of said arm and conjugate with said arcuate rack, said pawl being slidably to said second end of said carrier for radial movement relative to said second end of said arm between positions of locking engagement and unlocking disengagement with said rack;

a cam pinioned to said carrier and engaged with said arcuate pawl for urging said pawl between said positions of engagement and disengagement with said arcuate rack;

means for biasing said arcuate pawl toward said position of engagement; and a tilt-adjustment-arm attached to said cam for manual rotation thereof with mechanical advantage, for selectively locking and unlocking said arm in said one of said plurality of tilt positions about said second end.

11. The apparatus of claim 8, wherein said means for selectively locking and unlocking said arm in one of said plurality of longitudinal positions further comprises:

a straight rack attached to said central track, said rack having teeth disposed longitudinally therealong;

a straight pawl pinioned to said carrier, said pawl having a tooth disposed thereon for rotational movement relative to said carrier between positions of locking engagement and unlocking disengagement with said straight rack;

means for biasing said straight pawl toward said position of engagement; and a longitudinal-adjustment-arm attached to said straight pawl for manual rotation thereof with mechanical advantage, for selectively locking and unlocking said carrier in said one of said plurality of longitudinal positions along said central track.

12. The apparatus of claim 11, wherein:
said straight rack is formed into said central track.

13. The apparatus of claim 7, wherein:
said lateral tracks incline equally toward the front of said vehicle at about 10° and said central track inclines toward the rear of said vehicle by about 6° relative to the horizontal.

14. An apparatus for adjusting the longitudinal and tilt positions of a seat within a vehicle, comprising:

a U-shaped support frame attached to the bottom of said seat, said frame having a transverse portion extending across the front of said seat and a pair of arms disposed bilaterally below said seat and extending rearwardly thereunder to terminate in ends at about the lower edge of said seat;

a pair of rollers, each said roller being pinioned to one of said ends of said arms for longitudinal rotation relative thereto;

a pair of longitudinally-extending, laterally-parallel tracks attached to said vehicle bilaterally below said seat, each said track being slightly inclined toward the front of said vehicle and retaining one of said rollers for longitudinal rolling therein and for pivoting movement of said frame relative thereto;

a longitudinally-extending, middle track attached to said vehicle centrally below said seat between said bilateral tracks and laterally-parallel thereto and being inclined slightly toward the rear of said vehicle;

a carrier slidably retained upon said middle track for longitudinal translation therealong;

an arm having a first end and a second end, said first end being journalled medially about said transverse portion of said frame, said second end being pinioned to said carrier for longitudinal rotation relative thereto;

means for selectively locking and unlocking said arm in one of a plurality of tilt positions relative to said carrier; and means for selectively locking and unlocking said carrier in one of a plurality of longitudinal positions along said middle track; and said pair of bilateral tracks is inclined equally toward the front of said vehicle by about 10° and said middle track is inclined toward the rear of said vehicle by about 5°-6° relative to the horizontal, for automatically compensating for the tilt-position and vertical height of said seat simultaneously with longitudinally movement of said seat within said vehicle.

15. The apparatus of claim 14, wherein said support frame further comprises:

a pair of tubular, U-shaped members bifurcated toward the front of said seat into an upper member and a lower member, said upper member having a transverse portion extending laterally within the front of said seat and a pair of bilateral arms extending rearwardly therein and terminating in ends at about said lower rear edge of said seat, said lower member having a transverse portion extending laterally below the front of said seat and a pair of bilateral arms extending rearwardly thereunder and terminating in ends at about said lower rear edge of said seat, said arms being joined at said ends in corresponding bilateral pairs at about said lower rear edge;

a pair of gusset plates attached to said ends of said arms at about their point of junction for pinioning said rollers thereto; and a bar extending centrally between said transverse portions of said members and rigidly attached thereto at either end for rigidizing said frame.

16. The apparatus of claim 14, wherein said means for selectively locking and unlocking said arm in one of said plurality of tilt positions further comprises:

an arcuate rack fixed to said arm, said rack having a concave, toothed portion disposed concentrically with said second end of said arm;

an arcuate pawl having a convex, toothed portion disposed concentrically with second end of said arm and conjugate with said arcuate rack, said pawl being slidably retained on said carrier for radial movement relative to said second end between positions of locking engagement and unlocking disengagement with said rack;

a cam pinioned to said carrier and engaged with said arcuate pawl for urging said pawl between said positions of engagement and disengagement with said arcuate rack;

means for biasing said arcuate pawl toward said position of engagement; and a longitudinal-adjustment-arm attached to said cam for locking and unlocking said arm in said one of said plurality of tilt positions about said second end.

17. The apparatus of claim 14, wherein said means for selectively locking and unlocking said arm in one of a plurality of longitudinal positions further comprises:

a straight rack attached to said central track, said rack having teeth disposed longitudinally therealong;

a straight pawl pinioned to said carrier, said pawl having a tooth disposed thereon for rotational movement relative to said carrier between positions of locking engagement and unlocking disengagement with said straight rack;

means for biasing said straight pawl toward said position of locking engagement with said straight rack; and a longitudinal-adjustment-arm attached to said straight pawl for manual rotation thereof with mechanical advantage, for selectively locking and unlocking said carrier in said one of said plurality of longitudinal positions along said central track.

* * * * *

UNITED STATES PATENT AND TRADEMARK OFFICE
CERTIFICATE OF CORRECTION

PATENT NO. : 4,771,975

DATED : September 20, 1988

INVENTOR(S) : Richard F. Johnson and Elaine Schultz

It is certified that error appears in the above-identified patent and that said Letters Patent is hereby corrected as shown below:

Claim 10 should read as follows:

10. The apparatus of claim 8, wherein said means for selectively locking and unlocking said arm in one of a plurality of tilt positions further comprises:

an arcuate rack fixed to said arm, said rack having a concave, toothed portion disposed concentrically with said second end of said arm;

an arcuate pawl having a convex, toothed portion disposed concentrically with said second end of said arm and conjugate with said arcuate rack, said pawl being slidably <u>retained on</u> [to said second end of] said carrier for radial movement relative to said second end of said arm between positions of locking engagement and unlocking disengagement with said rack;

a cam pinioned to said carrier and engaged with said arcuate pawl for urging said pawl between said positions of engagement and disengagement with said arcuate rack;

means for biasing said arcuate pawl toward said position of engagement; and a tilt-adjustment-arm attached to said cam for manual rotation thereof with mechanical advantage, for selectively locking and unlocking said arm in said one of said plurality of tilt positions about said second end.

Signed and Sealed this

Eleventh Day of April, 1989

*Attest:*

DONALD J. QUIGG

*Attesting Officer*   *Commissioner of Patents and Trademarks*